(12) United States Patent
Regep, II

(10) Patent No.: US 8,401,969 B2
(45) Date of Patent: Mar. 19, 2013

(54) VIRTUAL TRAVELER'S CHECK

(75) Inventor: John Regep, II, Victoria, MN (US)

(73) Assignee: MoneyGram International, Inc., Dallas, TX (US)

(*) Notice: Subject to any disclaimer, the term of this patent is extended or adjusted under 35 U.S.C. 154(b) by 370 days.

(21) Appl. No.: 12/716,355

(22) Filed: Mar. 3, 2010

(65) Prior Publication Data

US 2011/0218913 A1 Sep. 8, 2011

(51) Int. Cl.
*G06Q 40/00* (2012.01)
(52) U.S. Cl. ............. 705/44; 705/39; 235/379; 235/380
(58) Field of Classification Search .................... 705/39, 705/44; 235/379, 380
See application file for complete search history.

(56) References Cited

U.S. PATENT DOCUMENTS

| | | | | |
|---|---|---|---|---|
| 3,859,508 A * | 1/1975 | Brosow et al. | ................ | 235/380 |
| 3,950,013 A * | 4/1976 | Tagliaferri | .................... | 283/100 |
| 3,950,015 A * | 4/1976 | Shrock | ............................. | 283/70 |
| 4,299,073 A * | 11/1981 | Golicz et al. | .................... | 53/493 |
| 4,997,188 A * | 3/1991 | Nilssen | ....................... | 705/14.14 |
| 5,023,782 A * | 6/1991 | Lutz et al. | ........................ | 705/45 |
| 5,442,162 A * | 8/1995 | Armel | ........................... | 235/381 |
| 5,798,508 A * | 8/1998 | Walker et al. | ................. | 235/381 |
| 6,003,763 A * | 12/1999 | Gallagher et al. | ............ | 235/379 |
| 6,338,049 B1 * | 1/2002 | Walker et al. | .................... | 705/44 |
| 6,820,803 B1 * | 11/2004 | Browning et al. | ............ | 235/380 |
| 6,857,565 B2 * | 2/2005 | Smith | ........................... | 235/380 |
| 7,103,577 B2 * | 9/2006 | Blair et al. | ....................... | 705/74 |
| 7,104,440 B2 * | 9/2006 | Hansen et al. | ................. | 235/379 |
| 7,175,074 B2 * | 2/2007 | Mejias et al. | ................. | 235/379 |
| 7,229,011 B2 * | 6/2007 | Hansen et al. | ................. | 235/379 |
| 7,308,426 B1 * | 12/2007 | Pitroda | ........................... | 705/35 |
| 7,389,913 B2 * | 6/2008 | Starrs | ............................. | 235/379 |
| 7,496,537 B2 * | 2/2009 | Walker et al. | .................... | 705/44 |
| 7,539,646 B2 * | 5/2009 | Gilder et al. | .................... | 705/44 |
| 7,549,575 B2 * | 6/2009 | Hansen et al. | ................. | 235/379 |
| 7,620,603 B2 * | 11/2009 | Gilder et al. | .................... | 705/44 |
| 7,660,771 B2 * | 2/2010 | Orcutt | ............................. | 705/64 |
| 7,702,588 B2 * | 4/2010 | Gilder et al. | .................... | 705/44 |
| 7,984,848 B1 * | 7/2011 | Browning et al. | ............ | 235/380 |
| 8,332,329 B1 * | 12/2012 | Thiele | ............................. | 705/64 |
| 2001/0001856 A1 * | 5/2001 | Gould et al. | .................... | 705/39 |
| 2002/0042766 A1 * | 4/2002 | Walker et al. | .................... | 705/35 |
| 2003/0024979 A1 * | 2/2003 | Hansen et al. | ................. | 235/379 |

(Continued)

OTHER PUBLICATIONS

"IBAA, Thomas Cook to Test Visa's Travel Card." American Banker, p. 12. Oct. 10, 1996.*

(Continued)

*Primary Examiner* — Jagdish Patel
*Assistant Examiner* — Sara C Hamilton
(74) *Attorney, Agent, or Firm* — Faegre Baker Daniels LLP

(57) ABSTRACT

The purchase and redemption of virtual traveler's checks is managed. A purchase request is received, which includes purchasing customer identification information and a request for one or more virtual traveler's checks. Each of the one or more virtual traveler's checks has one of a predetermined set of fixed denominations. A check number is issued for each of the one or more virtual traveler's checks. Each check number is associated with the purchasing customer identification information. A redemption request is then received, which includes redeeming customer identification information and a request to redeem at least one of the one or more virtual traveler's checks. The release of funds is approved in an amount equal to the denominations of the requested virtual traveler's checks if the redeeming customer identification information matches the purchasing customer identification information.

11 Claims, 2 Drawing Sheets

U.S. PATENT DOCUMENTS

| | | | |
|---|---|---|---|
| 2003/0111526 A1* | 6/2003 | Smith | 235/379 |
| 2003/0115126 A1* | 6/2003 | Pitroda | 705/36 |
| 2004/0143553 A1* | 7/2004 | Torget et al. | 705/66 |
| 2005/0114264 A1* | 5/2005 | Torget et al. | 705/44 |
| 2006/0049242 A1* | 3/2006 | Mejias et al. | 235/379 |
| 2007/0007332 A1* | 1/2007 | Hansen et al. | 235/379 |
| 2007/0131758 A1* | 6/2007 | Mejias et al. | 235/379 |
| 2007/0288380 A1* | 12/2007 | Starrs | 705/45 |
| 2008/0033870 A9* | 2/2008 | Gutierrez-Sheris | 705/39 |
| 2008/0035723 A1* | 2/2008 | Hansen et al. | 235/379 |
| 2008/0114659 A1* | 5/2008 | Pitroda | 705/21 |
| 2008/0140579 A1* | 6/2008 | Sanjiv | 705/76 |
| 2008/0249931 A1* | 10/2008 | Gilder et al. | 705/39 |
| 2008/0306839 A1* | 12/2008 | Starrs | 705/27 |
| 2009/0138400 A1* | 5/2009 | Smith | 705/44 |
| 2009/0138401 A1* | 5/2009 | Smith | 705/44 |
| 2009/0283585 A1* | 11/2009 | Hansen et al. | 235/379 |

OTHER PUBLICATIONS

"Citibank/Visa Int'l to Issue E-Traveler's Checks." Comline-Tokyo Financial Wire, p. 990811100002. Aug. 11, 1999.*

"Smart Bits: Amex, Disney Team Up on Stored Value Card," American Banker, v 163, n 153, p. 15. Aug. 12, 1998.*

* cited by examiner

VIRTUAL TRAVELER'S CHECK

TECHNICAL FIELD

The present invention relates to electronic commerce. More particularly, the present invention relates to systems and methods for purchasing and redeeming virtual traveler's checks.

BACKGROUND

Some forms of payment, such as cash, checks, credit cards, and the like, are physical objects that are carried and presented to effectuate payment. Consequently, these forms of payment are inherently subject to loss or theft, which can lead to loss of funds associated with the forms of payment and/or damage to credit ratings. In order to avoid having to carry these forms of payment, such as during travel, other vehicles for obtaining cash that include additional security may be used. For example, traveler's checks require a matching signature at the point of redemption to obtain cash. However, traveler's checks still require carrying a physical object that may be lost or stolen, and the signature to redeem the traveler's check can be forged.

Another example of a method of obtaining cash at a destination is through the use of a card in an automatic teller machine (ATM). ATM cards include a secret personal identification number (PIN) that is entered at the ATM to obtain cash. However, ATM cards also have drawbacks, including a daily withdrawal limit, fees for withdrawals (both from the issuing bank and the company that supplies the ATM), limited availability overseas, and/or requiring a bank account to be associated with the ATM card.

SUMMARY

In one aspect, the present invention relates to managing the purchase and redemption of virtual traveler's checks. A purchase request is received, which includes purchasing customer identification information and a request for one or more virtual traveler's checks. Each of the one or more virtual traveler's checks has one of a predetermined set of fixed denominations. A check number is issued for each of the one or more virtual traveler's checks. Each check number is associated with the purchasing customer identification information. A redemption request is then received, which includes redeeming customer identification information and a request to redeem at least one of the one or more virtual traveler's checks. The release of funds is approved in an amount equal to the denominations of the requested virtual traveler's checks if the redeeming customer identification information matches the purchasing customer identification information.

In another aspect, the present invention relates to a virtual traveler's check system including a purchase computer, a server, and a redemption computer. The purchase computer is used to make a purchase request. The purchase request includes purchasing customer identification information, a request for one or more virtual traveler's checks, and a funding source for the one or more virtual traveler's checks. Each of the one or more virtual traveler's checks having a denomination. The server receives the purchase request and issues a check number for each of the one or more virtual traveler's checks and associates the check numbers with the purchasing customer identification information. The redemption computer is used to make a redemption request. The redemption request includes redeeming customer identification information and a request to redeem at least one of the one or more virtual traveler's checks. The redemption computer retrieving the check numbers associated with the requested virtual traveler's checks, and the server approves release of funds at the redemption computer in an amount equal to the denominations of the requested virtual traveler's checks if the redeeming customer identification information matches the purchasing customer identification information.

In a further aspect, the present invention relates to processing a virtual traveler's check. A purchase request is received at a purchase location. The purchase request includes purchasing customer identification information, a request for a virtual traveler's check, and a funding source for the virtual traveler's check. The virtual traveler's check has a denomination. The purchase request is transmitted to a server, and a check number is issued for the virtual traveler's check. The check number, which is associated with the purchasing customer identification information, is transmitted to the purchase location. A redemption request is then received at a redemption location. The redemption request includes redeeming customer identification information and a request to redeem the virtual traveler's check. The redemption request to the server, and the server approves the redemption request if the redeeming customer identification information is valid and matches the purchasing customer identification information. Funds are then issued at the redemption location in an amount equal to the denomination of the virtual traveler's check in the redemption request.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
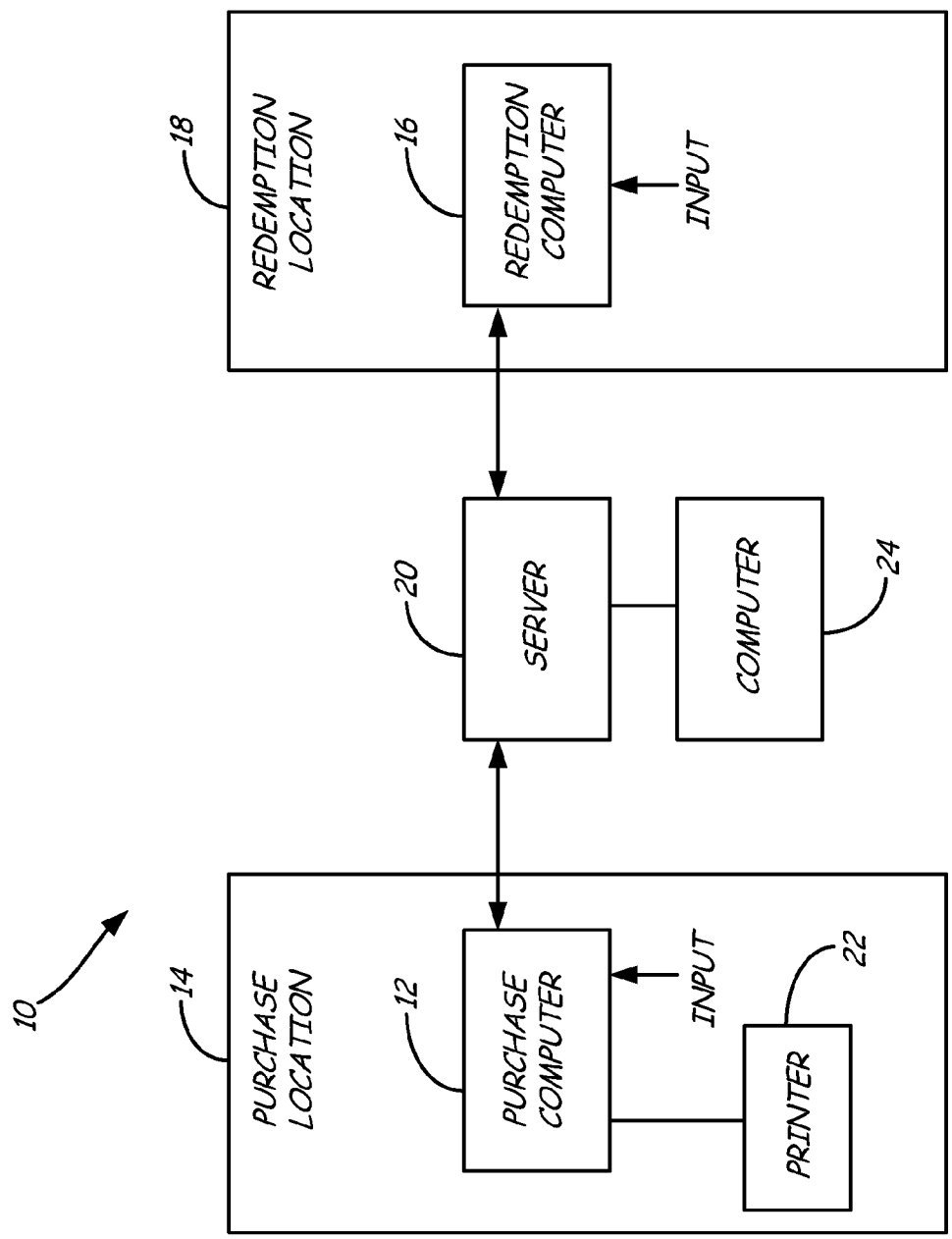
FIG. 1 is a block diagram of an embodiment of a system for purchasing and redeeming virtual traveler's checks.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a block diagram of an embodiment of a system 10 for purchasing and redeeming virtual traveler's checks. System 10 includes a purchase computer 12 at a purchase location 14 and a redemption computer 16 at a redemption location 18. The purchase computer 12 and the redemption computer 16 communicate with a central server 20, for example via a communication network such as the internet. In some embodiments, a printer 22 is connected to the purchase computer 12 at the purchase location 14. As will be described in more detail herein, the system 10 facilitates the purchase of one or more virtual traveler's checks via the purchase computer 12, and the redemption of the virtual traveler's checks via the redemption computer 16. The server 20 coordinates the requesting and approval processes for the purchase and redemption of the one or more virtual traveler's checks.

The purchase location 14 may be a facility that is approved by a financial services organization to send purchase requests for virtual traveler's checks to the server 20. The purchase location 14 may be a store or dedicated location that provides redemption services for virtual traveler's checks. Alternatively, the purchase location 14 may be accessed remotely, such as via telephone or the internet. The purchase computer 12 is operated by an agent at the approved purchase location 14. The purchase computer 12 may include software that facilitates entry of information to request purchase of virtual traveler's checks for subsequent transmission to the server 20 for approval. The agent at the purchase location 14 also reviews purchaser identification and accepts funds from the purchaser of the virtual traveler's checks. In some embodiments, the agent accepts funds on behalf of the financial services organization. The purchase location 14 may also include a telephone or other voice communications device to contact the financial services organization if questions arise during the purchase request process. While a single purchase location 14 is shown in FIG. 1, in actual implementation, the system 10 includes a plurality of purchase locations 14 that each includes a purchase computer 12 that communicates with the server 20.

In alternative embodiment, the purchase computer 12 may be any computer configured to provide information to the server 20 via a secure internet or server connection. For example, the purchase computer 12 may be a home computer, kiosk, or other interactive device. The purchase computer 12 may include a web browser or other application that provides a user interface to enter information to request purchase of virtual traveler's checks. The web browser may allow for entry of purchaser identification information and purchaser account information, the latter of which authorizes withdrawal of funds from an account with a financial institution to fund the one or more virtual traveler's checks. As another example, the purchase computer 12 may be configured to receive purchase information from the purchaser via telephone or interactive voice recognition systems.

The redemption location 18 may be a facility that is approved by the financial services organization to send redemption requests for purchased virtual traveler's checks to the server 20 and issue funds to traveler's check redeemers upon approval of the redemption requests. The redemption location 18 may be a store or dedicated location that provides redemption services for virtual traveler's checks. Alternatively, the redemption location 18 may be accessed remotely, such as via telephone or the internet. The redemption computer 16 at the redemption location 18 may be operated by an agent at the approved redemption location 18. The redemption computer 18 may include software that facilitates entry of information to request redemption of virtual traveler's checks for subsequent transmission to the server 20 for approval. The agent at the redemption location 18 also reviews purchaser identification and accepts funds from the redeemer of the virtual traveler's checks. The redemption location 18 may also include a telephone or other voice communications device to contact the financial services organization if questions arise during the purchase request process. While a single redemption location 18 is shown in FIG. 1, in actual implementation, the system 10 includes a plurality of redemption locations 18 that each include a redemption computer 16 that communicates with the server 20.

The server 20 may be housed and/or operated by or on behalf of the financial services organization that approves the purchase of virtual traveler's checks at the purchase location 14 and the redemption of virtual traveler's checks at the redemption location 18. The server 20 facilitates approval of purchase requests from the purchase location 14 and redemption requests from the redemption location 18. In some embodiments, the server 20 is configured to process purchase and redemption requests automatically. In other embodiments, the server 20 provides information to a user at the financial services organization for review and approval. For example, the server 20 may be connected to a computer 24 that provides an interface to a user at the financial services organization to review and approve or deny virtual traveler's check transactions. The server 20 includes storage capabilities to store information from purchase requests for later retrieval during the redemption request approval process. In addition, the server 20 may store other information such as, for example, past customer purchase and redemption activity, customer account information, and computer identification and log-in information for the purchase computer 12 and redemption computer 16.

Figure 2:
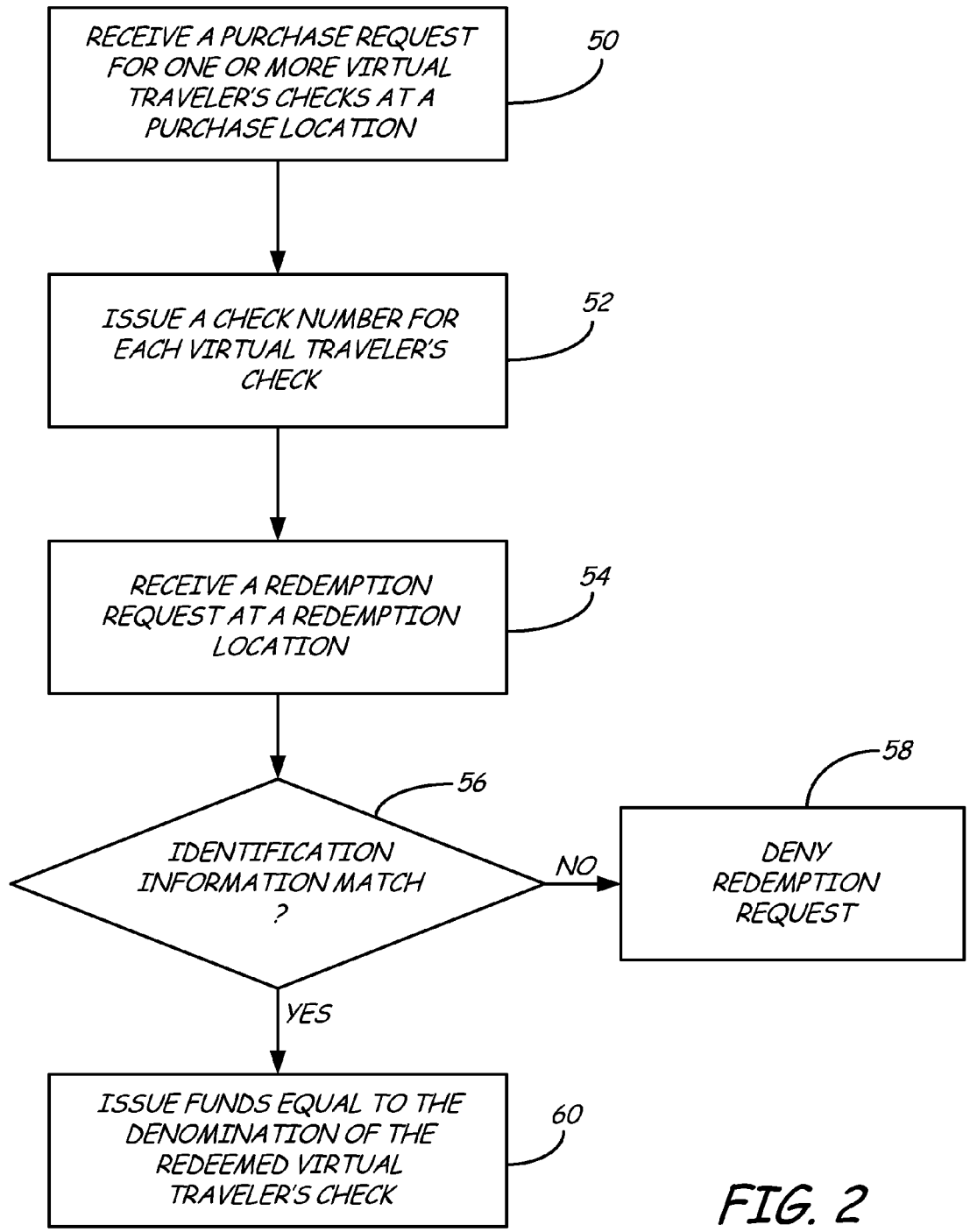
FIG. 2 is a flow diagram illustrating an embodiment of a process of purchasing and redeeming virtual traveler's checks in the system of FIG. 1.

FIG. 2 is a flow diagram illustrating an embodiment of a process of purchasing and redeeming virtual traveler's checks in the system 10. In step 50, a purchase request is received from a purchasing customer at the purchase location 14. The purchase request includes information about the purchasing customer and the quantity and denominations of the one or more virtual traveler's check s requested. The purchase request may include other information, such as customer account information, redemption location information, and/or destination country information. This information is entered into the purchase computer 12, either by an agent at the purchase location 14, or by the purchasing customer via a user interface on the purchase computer 12 as described above.

The purchase request includes identification information about the purchasing customer, such as name, address, telephone number, social security number, and the like. The purchasing customer may be requested to supply photograph identification to the purchasing agent to obtain the identification information. The purchasing customer identification information may also include an identification number from the photograph identification (e.g., driver's license number, passport number, etc.). A photograph of the purchasing customer may also be provided with the purchase request. The purchasing customer identification information may also include other forms of identification, such as biometric identification (e.g., fingerprint, eye scan, etc.).

The purchase request also includes the denominations and quantity of virtual traveler's checks traveler's checks. In some embodiments, the purchasing customer selects the desired denominations from a predetermined set of available denominations, and specifies the quantity of each denomination requested. For example, the predetermined set of fixed denominations of virtual traveler's checks may include denominations such as $20, $50, $100, and $500. The purchasing customer selects the quantity of each denomination to have the desired amount available at the purchasing customer's destination. The purchasing customer then remits cash or other funds to the purchasing agent to cover the cost of the requested virtual traveler's checks and any commissions or fees charged by the financial services organization. Alternatively, if the customer is submitting the request through an internet based application, the customer may provide account information (e.g., bank account, credit card, etc.) for a funding source to cover the cost of the virtual traveler's checks.

If the purchasing customer wishes to have the virtual traveler's checks available for redemption internationally, the purchase request may further include the intended country of redemption. In some embodiments, the purchase request locks in the exchange rate for the intended country of redemption.

The purchase request is then transmitted by the purchase computer 12 to the server 20 for processing and approval. In some embodiments, the financial services organization that controls and operates the server 20 may perform fraud and compliance evaluations on the information supplied in the purchase request. For example, the financial services organization may compare the purchasing customer identification information to a database of customers with past fraudulent activity stored in the server 20 as a factor in determining whether to approve the purchase request. If the purchase request includes purchasing customer account information, the server 20 may also assure that sufficient funds are available to cover the cost of the requested virtual traveler's checks. The approval process may be performed automatically by the server 20, or may be performed by a user of computer 24.

If the purchase request meets all requirements and passes the fraud and compliance evaluations, the server 20 approves the purchase request. Then, in step 52, the server generates the virtual traveler's checks by issuing a check number or other identifier for each requested virtual traveler's check. For example, if the purchase request includes a request for five $100 virtual traveler's checks, the server 20 generates five check numbers, one for each of the virtual traveler's checks. The server 20 associates each virtual traveler's check number with the purchasing customer's identification, and stores the associated check number and identification information. The server 20 then sends the check numbers to the purchase computer 12, and the check numbers are provided to the purchasing customer. In some embodiments, a receipt including the check numbers is generated on the printer 22 attached to the purchase computer 12.

When the customer wishes to redeem the virtual traveler's checks, the customer goes to a redemption location 18. For example, the redemption location 18 may be located in the city, state, or country of the customer's travel destination. Then, in step 54, the redemption location 18 receives a redemption request from the redeeming customer. The redemption request may include a request to redeem all or fewer than all of the purchased virtual traveler's checks.

The redeeming customer supplies the redemption location 18 with photograph identification, and the redeeming agent retrieves the virtual traveler's check transactions associated with the supplied identification. In some embodiments, the virtual traveler's checks may include a redemption delay period, in which the customer is unable to redeem the virtual traveler's checks until the redemption delay period has lapsed. This delay reduces the possibility of a fraudulent redemption of the virtual traveler's checks prior to the customer reaching the travel destination. In some embodiments, the customer specifies the redemption delay period in the purchase request. For example, the customer may request that the virtual traveler's checks not be redeemable prior to the expected arrival date at the customer's destination. Thus, when the transaction record is retrieved by the redeeming agent, the server 20 or redeeming agent may assure that any redemption delay period has lapsed prior to proceeding with the redemption process.

The redeeming agent compares the photograph on the photograph identification with the redeeming customer to assure the identification matches the customer. The redeeming agent also compares the identification information with the information on the retrieved virtual traveler's check transactions. In some embodiments, the information on the photograph identification may be sent to the server 20 via the redemption computer 16 to allow the financial services organization to confirm the validity of the supplied identification (e.g., driver's license, passport, etc.). If the customer was asked to supply biometric identification when submitting the purchase request, the customer may also be asked to supply the biometric identification at the redemption location 18.

If, in decision step 56, the redeeming customer identification information does not match the purchasing customer identification information, then, in step 58, the redemption request is denied at the redemption location. For example, the identification information supplied at the redemption computer 16 may be transmitted to the server 20 for comparison to the identification information associated with the virtual traveler's check numbers. The identification information supplied at the redemption location may also be compared by the redemption agent to information in the retrieved record. In some embodiments, the redemption request is denied by the redemption agent if the same photograph identification is not used for both the purchase and redemption requests. In other embodiments, the redemption request is denied if the photograph identification supplied for the redemption request cannot be correlated to the redeeming customer (e.g., the photograph does not match the customer's appearance).

If, in decision step 56, the redeeming customer identification information matches the purchasing customer identification information, the financial services organization approves release of the funds to the redeeming customer. Then, in step 60, the redeeming agent issues funds equal to the denominations of the redeemed virtual traveler's checks. For example, in the example above in which five $100 virtual traveler's checks were purchased, the redeeming customer may wish to redeem two $100, and save the remaining three for later redemption. The redeeming agent thus pays the redeeming customer $200 for the redeemed virtual traveler's checks.

After the virtual traveler's checks are redeemed, the financial services organization may pay the purchasing location 12 and/or the redemption location 16 a commission for the virtual traveler's check transactions. For example, the financial services organization may pay the purchasing location 12 and or the redemption location 16 a percentage of the total cost of traveler's checks purchased and redeemed, or may pay based on the quantity of virtual traveler's checks purchased. The commissions paid by the financial services organization may be included in fees charged to the customer to purchase and/or redeem the virtual traveler's checks.

In some embodiments, the customer is not able to request funds in an amount different than the denominations of the purchased virtual traveler's checks. For example, if only $100 virtual traveler's checks are purchased, the customer would not be able to redeem $50 of a $100 virtual traveler's check. In essence, virtual traveler's checks are redeemed in whole in much the same way as conventional traveler's checks.

If the customer redeems fewer than all of the virtual traveler's checks at redemption locations 18 at the customer's destination, the customer may redeem any remaining traveler's checks at the purchase location 14.

In summary, embodiments of the present invention relate to managing the purchase and redemption of virtual traveler's checks. A purchase request is received, which includes purchasing customer identification information, a request for one or more virtual traveler's checks, and a funding source for the one or more virtual traveler's checks. Each of the one or more virtual traveler's checks has a denomination. A check number is issued for each of the one or more virtual traveler's checks. Each check number is associated with the purchasing customer identification information. A redemption request is then received, which includes redeeming customer identification information and a request to redeem at least one of the one or more virtual traveler's checks. The release of funds is approved in an amount equal to the denominations of the requested virtual traveler's checks if the redeeming customer identification information matches the purchasing customer identification information.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method for operating a computer system for managing the purchase and redemption of virtual traveler's checks, the method comprising:
   receiving data representative of a purchase request at a server from a customer, the purchase request sent from a purchasing computer and including purchasing customer identification information and a request for one or more virtual traveler's checks, each of the one or more virtual traveler's checks having one of a predetermined set of fixed denominations;
   issuing from the server to the customer at the purchasing computer data representative of a check number for each of the one or more virtual traveler's checks, wherein each check number is associated with the purchasing customer identification information;
   receiving at the server an electronic redemption request from a redemption computer including redeeming customer identification information and a request to redeem at least one of the one or more virtual traveler's checks; and
   transmitting from the server to the redemption computer an electronic release approval to release funds in an amount equal to the denominations of the requested virtual traveler's checks only if the redeeming customer identification information matches the purchasing customer identification information.

2. The method of claim 1, wherein the purchase request further includes redemption location information, and wherein the transmitting step further comprises verifying that the redemption location information matches a location from which the redemption request was received.

3. The method of claim 1, wherein the purchase request further includes purchasing customer account information from which the one or more virtual traveler's checks are to be debited.

4. The method of claim 1, and further comprising:
   monitoring a time period between the purchase request and the redemption request; and
   denying the redemption request if the time period is less than a redemption delay time period.

5. The method of claim 1, wherein prior to the transmitting step, the method further comprises:
   comparing the redeeming customer identification information to the purchasing customer identification information.

6. The method of claim 5, wherein the redeeming customer identification information and the purchasing customer identification information comprises at least one of photo identification and biometric information.

7. The method of claim 1, wherein the purchase request further includes information associated with a customer funding source, and wherein after the issuing step, the method further comprises:
   debiting a purchase amount from the customer funding source equal to a total of the predetermined set of fixed denominations of the one or more virtual traveler's checks.

8. The method of claim 7, wherein prior to the debiting step, the method further comprises:
   verifying that the customer funding source includes funds sufficient to cover the purchase amount.

9. The method of claim 1, wherein the issuing step comprises:
   generating a receipt including the check number for each of the one or more virtual traveler's checks.

10. The method of claim 1, wherein the purchase request locks in an exchange rate for redeeming the one or more virtual traveler's checks.

11. The method of claim 1, and further comprising:
   receiving the redemption request from the purchasing computer if the one or more virtual traveler's checks are not redeemed at the redemption computer.

* * * * *